United States Patent
Hamarsnes et al.

(10) Patent No.: US 10,359,261 B2
(45) Date of Patent: Jul. 23, 2019

(54) HEAT INSULATING COATING FOR ALUMINIUM CARTRIDGE CASINGS FOR HAND GUNS

(71) Applicant: JH CASINGS AS, Raufoss (NO)

(72) Inventors: Johans Hamarsnes, Raufoss (NO); Sveinung Gihle Raddum, Hov (NO)

(73) Assignee: JH CASINGS AS, Raufoss (NO)

( * ) Notice: Subject to any disclaimer, the term of this patent is extended or adjusted under 35 U.S.C. 154(b) by 0 days.

(21) Appl. No.: 15/324,868

(22) PCT Filed: Jul. 6, 2015

(86) PCT No.: PCT/IB2015/055094
§ 371 (c)(1),
(2) Date: Jan. 9, 2017

(87) PCT Pub. No.: WO2016/005877
PCT Pub. Date: Jan. 14, 2016

(65) Prior Publication Data
US 2017/0205212 A1 Jul. 20, 2017

(30) Foreign Application Priority Data

Jul. 11, 2014 (NO) .................................. 20140889

(51) Int. Cl.
| | |
|---|---|
| *F42B 5/295* | (2006.01) |
| *C09D 1/00* | (2006.01) |
| *C23C 22/78* | (2006.01) |
| *C23C 22/56* | (2006.01) |
| *C23C 22/73* | (2006.01) |
| *C23C 22/66* | (2006.01) |
| *C22F 1/04* | (2006.01) |
| *C09D 7/40* | (2018.01) |

(52) U.S. Cl.
CPC ................ *F42B 5/295* (2013.01); *C09D 1/00* (2013.01); *C22F 1/04* (2013.01); *C23C 22/56* (2013.01); *C23C 22/66* (2013.01); *C23C 22/73* (2013.01); *C23C 22/78* (2013.01); *C09D 7/69* (2018.01)

(58) Field of Classification Search
CPC .................................. F42B 5/295; F42B 5/297
USPC ........................................................ 102/464
See application file for complete search history.

(56) References Cited

U.S. PATENT DOCUMENTS

| | | |
|---|---|---|
| 2,196,018 A | 4/1940 | Korpiun |
| 2,919,647 A | 1/1960 | Dear et al. |
| 2,972,947 A | 2/1961 | FitzSimmons et al. |
| 3,039,899 A | 6/1962 | Keller et al. |
| 3,048,105 A | 8/1962 | Schlatter |
| 3,282,215 A | 11/1966 | Roth |
| 3,726,721 A | 4/1973 | Wittrock et al. |
| 3,752,080 A * | 8/1973 | Weyhmuller ............ F42B 5/295 102/464 |
| 3,830,157 A | 8/1974 | Donnard et al. |
| 5,066,330 A * | 11/1991 | Holcombe, Jr. ......... C04B 28/26 106/286.1 |
| 2016/0245626 A1* | 8/2016 | Drieling .................. F42B 5/295 |

OTHER PUBLICATIONS

Euel K. Cowan, Mar. 9, 2019, EIC 3600 Search Report, Scientific and Technical Information Center, 10 pages.*
International Search Report dated Oct. 5, 2015 in International (PCT) Application No. PCT/IB2015/055094.
Written Opinion of the International Searching Authority dated Oct. 5, 2015 in International (PCT) Application No. PCT/IB2015/055094.
Norwegian Search Report dated Feb. 11, 2015 in Norwegian Application No. 20140889.
Office Action dated Sep. 17, 2018 in corresponding European Application No. 15 753 768.9.
Edith Villeneuve, "Les traitements thermiques des alliages d'aluminium", Apr. 30, 2009, XP055500611, Retrieved from the internet: URL: http://www.cqrda.ca/wp-content/uploads/2016/04/Annexe-4_TThermiques.pdf, retrieved on Aug. 17, 2018, cited in CA.

* cited by examiner

*Primary Examiner* — Bret Hayes
(74) *Attorney, Agent, or Firm* — Wenderoth, Lind & Ponack, L.L.P.

(57) ABSTRACT

Casing for ammunition for hand guns made from aluminium or aluminium alloy, and which has a coating of 2-50 μm of $CaCO_3(s)$ on the inner and outer surfaces of the casing, and a method for producing the coated casing.

8 Claims, No Drawings

HEAT INSULATING COATING FOR ALUMINIUM CARTRIDGE CASINGS FOR HAND GUNS

This invention concerns casings for ammunition for hand guns.

BACKGROUND

Almost all ammunition for hand guns consist of a casing with an ignition and drive charge and a projectile.

Brass has proved to be an excellent material for ammunition casings for small calibre hand guns and up to large calibre cannons, except for the weight. Brass has a density in the range of 8.4 to 8.7 g/cm$^3$, such that the casings are relatively heavy and contribute strongly to limit the amount of ammunition soldiers/combat units are able to carry in the field. Another issue is that brass contains copper, which is a toxic metal, such that from an environmental point of view, it is a desire to replace brass casings with casings made from a different and more environmentally compatible material. In addition, another relatively recent problem is that the global copper reserves are beginning to get depleted, such that, in a public perspective, it is desired to reserve the remaining copper reserves for other more important purposes.

Consequently, alternative materials for ammunition casings for hand guns have been searched for. One material which for a long time has been tried, known to be used for the first time in the early nineteenth century, is aluminium. Aluminium may be alloyed to obtain almost the same mechanical properties as brass casings; however, it possesses only about ⅓ of the density of brass. Thus, a weight saving of about 60% for ammunition is obtainable by substituting the brass casing for an aluminium casing.

However, two problems have hampered the use of aluminium. One is that the oxide layer formed at the surface is brittle and very hard, and it tends to crack and fall off during firing of the ammunition, and form an effective abrasive agent (particles of $Al_2O_3$) in the chamber which leads to abrasive wear problems. The other problem is that aluminium has a heat resistance which is too poor to withstand the generation of heat during firing, such that a risk of the gun powder gas burning through the casing arises.

PRIOR ART

From U.S. Pat. No. 2,196,018 it is known to coat the outside of aluminium casings for hand gun ammunition with a 1 to 30 μm thick $Al_2O_3$ coating, or alternatively, a fluoride or phosphate layer for heat isolating the casing from the chamber wall of the gun.

From U.S. Pat. No. 3,048,105 it is known to heat protecting aluminium casings for hand gun ammunition by coating the inside and outside of a first oxide with thickness 15-40 μm and a second lacquer layer with thickness 15-25 μm.

From U.S. Pat. No. 3,830,157 it is known to line the inside of aluminium casings for hand gun ammunition with a resilient coating as protection against the heat, and to prevent gun powder gases from leaking out during cracking of the casing under firing.

From GB 1 268 726 it is known to line the inside of aluminium casings for hand gun ammunition with a rubber coating as protection against the heat, and to prevent gun powder gases from leaking out during cracking of the casing under firing.

To the knowledge of the inventor, it is still an unsolved problem that the heat from the gun powder gases, which may reach about 2000° C., burns through the casing and damage the gun. This problem is especially relevant for automatic weapons firing series of shots, because the amount of heat produced may be high enough to trigger an exothermic oxidation of the metal (the metal burns). It is also an unsolved problem that the oxide layer on the surface of the aluminium cracks and falls off in the form of small $Al_2O_3$ particles, which forms a strongly abrasive "gravel" in the gun chamber, causing an unacceptable abrasive wear of the gun when the empty casing is pulled out and a new round is inserted into the chamber; this is especially relevant for automatic weapons firing series of rounds.

OBJECT OF THE INVENTION

Thus, it is an object of the present invention to provide aluminium ammunition casings for guns which are sufficiently heat protected from the gun powder gases, and which do not create unacceptable abrasive problems in the gun chamber.

DESCRIPTION OF THE INVENTION

The present invention is based on the discovery, during several years of test firing different hand guns by the inventor, that a thin layer of calcium carbonate, as thin as down to only 2 μm, provides a protection against the heat from the gun powder gases which is strong enough to practically eliminate the problem of burning through, and that the coating is both sufficiently soft not to damage the steel of the gun chamber and at the same time mechanically robust and sufficiently ductile to prevent the always present aluminium oxide layer on the casing and/or the calcium carbonate coating from cracking and fall off and form abrasive particles in the gun chamber.

In a first aspect, the present invention concerns a casing for ammunition for hand guns, which is characterized by comprising, a casing made from aluminium or aluminium alloy, and
a coating of 2-50 μm $CaCO_3(s)$ placed directly onto the inner and outer surface of the casing.

The term "the inner surface of the casing" shall in this context mean the inner aluminium surface of the casing, i.e. the inner walls of the casing which defines the space housing the gun powder and the ignition charge. The term "the outer surface of the casing" shall in this contest mean the outer aluminium surface of the casing, i.e. the side of the casing wall which face the wall of the gun chamber. The term "aluminium surface", as used herein, means the surface of an aluminium phase, or an aluminium alloy phase, including the protecting oxide layer which is formed when the metal/alloy comes into contact with the oxygen in the surrounding air.

The term "ammunition for hand guns" means in this context any ammunition consisting of a casing with an ignition and driving charge and a single projectile of calibre 20 mm or smaller. The dimensions and design of the casing may vary much, depending on the calibre and which type of gun in which the ammunition shall be used; e.g. pistol, revolver, rifle, submachine gun, automatic rifle, machine gun, etc. However, it is within the knowledge of the skilled person to be able to decide the design and dimensions of the casing according to a first aspect of the invention, to satisfy the requirement of the individual gun regarding compatibility between gun and ammunition. Due to the diameter deviation tolerance for the ammunition, the $CaCO_3$ coating will often be limited upwards to a thickness of 20 µm; however, a thicker coating may be used if this does not create problems with the compatibility requirements of the gun. In practice, the maximum thickness of the $CaCO_3$ coating will be 50 µm. At the other end, it has been observed that a coating thickness of down toward 2 µm provides a satisfactory protection. In practice, the $CaCO_3$ coating may advantageously have a thickness in one of the ranges: from 2 to 50 µm, from 2 to 40 µm, from 2 to 30 µm, from 2 to 20 µm, from 2 to 10 µm, from 3 to 30 µm, from 3 to 20 µm, from 3 to 10 µm, from 4 to 20 µm, or from 4 to 10 µm.

Calcium carbonate in solid state, $CaCO_3(s)$, has a very low thermal conductivity of less than 1 W/mK, such that a coherent layer of $CaCO_3(s)$ applied directly onto the inner surface of the casing provides an effective thermal barrier which significantly reduces the heat exchange from the gun powder gas to the aluminium/aluminium alloy, and which thus protect the metal/metal alloy from damaging strong heating which involves risk of melting/burning through the metal/alloy.

Tests performed by the inventor show that casings in pure aluminium, i.e. an aluminium phase classified in the series AA1xxx according to the standard The Aluminium Association, may be used in the invention according to a first aspect. However, it has been discovered that an alloy containing magnesium is even more suitable. Without being bound by theory, it is assumed that this effect is due to the magnesium providing increased presence of hydroxide groups, —OH, on the surface of the casing, which gives increased ductility on the $Al_2O_3$ layer on the surface of the casing. Consequently, in an embodiment of the invention according to a first aspect, an alloy in the series AA5xxx, AA6xxx, or AA7xxx according to the Aluminium Association Standard may be used in the casing material. Unless specified differently, the specifications of the aluminium alloy refers to the standards of Aluminium Standards and Data and the Registration Records, issued by The Aluminium Association in 2010.

In a second aspect, the present invention concerns a method of producing a casing for ammunition for hand guns according to the first aspect of the invention, characterized by the method comprising:
  heating the casing made from aluminium or aluminium alloy to a temperature from 300 to 500° C.,
  immerse the heated casing made from aluminium or aluminium alloy into a aqueous solution of calcium carbonate containing 13 mg/L dissolved calcium carbonate and keep it immersed until the solution stops boiling, and
  pull the casing made from aluminium or aluminium alloy out of the aqueous calcium carbonate solution and heat it to 100-180° C. in air and maintain it at this temperature until the casing and the applied calcium carbonate coating is dried.

The method according to the second aspect of the invention is a very simple process which is well suited for scaling to industrial scale, and which provides a secure and simple way to coat both sides of the aluminium casings with a continuous and relatively homogenous $CaCO_3$ coating with a thickness of at least 2 µm. Generally, the more calcium carbonate dissolved, the thicker the coating formed; and, the more the casing is pre-heated, the thicker the coating formed. Consequently, it is possible to control the thickness of the formed coating by regulating the concentration of the aqueous calcium carbonate solution and/or the temperature to which the casing is pre-heated.

Calcium carbonate has solubility in water of 13 mg/litre at 25° C. Tests performed by the inventor show that this is the lower limit of concentration of the carbonate in the solution. Advantageously, a weak acid may be added to the aqueous solution, such as carbonic acid, to dissolve the calcium carbonate and create a more concentrated solution.

Tests performed by the inventor show that in addition to calcium carbonate, magnesium carbonate may advantageously be added to the aqueous solution, to increase the concentration of carbonate. In this case, the coating will contain the double salt $CaCO_3.MgCO_3$ in addition to $CaCO_3$.

VERIFICATION OF THE INVENTION

In a series of test firings by the inventor, casings of aluminium in the series AA7xxx and AA1xxx were cold flow compressed, with dimensions for guns of calibre 5.65× 45 mm standard NATO, which were pre-heated to just below 500° C., and immersed into a aqueous calcium carbonate solution added some carbonic acid, and which contained 15 mg/litre dissolved calcium carbonate. When the solution stopped boiling, the casings were removed and placed in an oven heated to 180° C. and dried. Then, the casings were equipped with ignition charge, driving charge, and a projectile.

Test firing with this ammunition in a Heckler & Koch HK416 assault rifle, using both single rounds and serial rounds, resulted in empty casings which were cold enough to be picked up directly after firing, without being burned, and without detecting any abnormal abrasive wear in the gun chamber after firing several hundred rounds.

The invention claimed is:

1. A casing for ammunition for hand guns, comprising,
  a casing made from an aluminium alloy belonging to series AA1xxx, AA5xxx, AA6xxx, or AA7xxx according to the Aluminium Association Standard, and
  a 2-50 µm thick coating of $CaCO_3(s)$ placed directly onto an inner and outer surface of the casing.

2. The casing according to claim 1, wherein the coating also comprises a double salt of $CaCO_3 \cdot MgCO_3$.

3. The casing according to claim 1, wherein the coating has a thickness selected from the group consisting of from 2 to 40 µm, from 2 to 30 µm, from 2 to 20 µm, from 2 to 10 µm, from 3 to 30 µm, from 3 to 20 µm, from 3 to 10 µm, from 4 to 20 µm, and from 4 to 10 µm.

4. A method of producing a casing for ammunition for hand guns comprising:
  heating a casing made from aluminium or aluminium alloy to a temperature of 300 to 500° C.,
  immersing the heated casing made from aluminium or aluminium alloy into an aqueous solution of calcium carbonate containing 13 mg/L of dissolved calcium carbonate until the solution stops boiling to apply a calcium carbonate coating directly onto an inner and outer surface of the casing made from aluminium or aluminium alloy, and
  pulling the casing made from aluminium or aluminium alloy out of the aqueous calcium carbonate solution and heating the casing to a temperature of 100 to 180° C. in air until the casing and the applied calcium carbonate coating is dried,
wherein the calcium carbonate coating applied directly onto the inner and outer surface of the casing is 2-50 µm thick.

5. The method according to claim 4, wherein a weak acid is added to the aqueous solution of calcium carbonate.

6. The method according to claim 5, characterized in wherein the acid is carbonic acid.

7. The method according to claim 4, further comprising adding magnesium carbonate in addition to the calcium carbonate to the aqueous solution.

8. The method according to claim 4, wherein the casing consists of an aluminium alloy belonging to series AA1xxx, AA5xxx, AA6xxx, or AA7xxx according to the Aluminium Association Standard.

* * * * *